(12) United States Patent
Bernhardt et al.

(10) Patent No.: US 12,043,126 B2
(45) Date of Patent: Jul. 23, 2024

(54) STRUCTURALLY INTEGRATED ENERGY SUPPLY SYSTEMS FOR AIRCRAFT AND METHODS OF FORMING THE STRUCTURALLY INTEGRATED ENERGY SUPPLY SYSTEMS

(71) Applicant: The Boeing Company, Chicago, IL (US)

(72) Inventors: Roger D. Bernhardt, St. Charles, MO (US); Donald V. Drouin, Jr., O'Fallon, IL (US)

(73) Assignee: The Boeing Company, Arlington, VA (US)

( * ) Notice: Subject to any disclaimer, the term of this patent is extended or adjusted under 35 U.S.C. 154(b) by 1555 days.

(21) Appl. No.: 16/282,096

(22) Filed: Feb. 21, 2019

(65) Prior Publication Data

US 2020/0269708 A1 Aug. 27, 2020

(51) Int. Cl.
*B60L 50/60* (2019.01)
*B64C 1/12* (2006.01)
(Continued)

(52) U.S. Cl.
CPC .............. *B60L 50/66* (2019.02); *B64C 1/12* (2013.01); *B64C 3/185* (2013.01); *B64C 3/20* (2013.01);
(Continued)

(58) Field of Classification Search
CPC .... B64C 1/00; B64C 3/00; B64C 1/12; B64C 1/065; B64C 3/185; B64C 3/20; H01M 2220/20
See application file for complete search history.

(56) References Cited

U.S. PATENT DOCUMENTS 5,156,225 A 10/1992 Murrin
2011/0269002 A1* 11/2011 Kanata ................ H01M 10/643
429/94
(Continued)

OTHER PUBLICATIONS

Zhang et al., "Multifunctional structural lithium-ion battery for electric vehicles," Journal of Intelligent Material Systems and Structures, vol. 28(12), 1603-1613, 2017.
(Continued)

*Primary Examiner* — Nathanael T Zemui
(74) *Attorney, Agent, or Firm* — Kolitch Romano Dascenzo Gates LLC

(57) ABSTRACT

Structurally integrated energy supply systems for aircraft and methods of forming the structurally integrated energy supply systems. The structurally integrated energy supply systems include an aircraft structural component, a cell array, and a plurality of energy-producing inserts. The aircraft structural component at least partially defines an interior region. The cell array includes a plurality of cell walls that defies a plurality of elongate cell volumes and is positioned within the interior region. Each energy-producing insert in the plurality of energy-producing inserts is positioned within a corresponding elongate cell volume in the plurality of elongate cell volumes and is configured to produce a corresponding insert electric current. The cell array provides structural load distribution to the aircraft structural component via the plurality of cell walls and contributes to a structural stiffness of the aircraft structural component.

22 Claims, 8 Drawing Sheets

(51) Int. Cl.
*B64C 3/18* (2006.01)
*B64C 3/20* (2006.01)
*H01G 9/035* (2006.01)
*H01G 9/04* (2006.01)
*H01M 10/0525* (2010.01)
*H01M 50/213* (2021.01)
*H01M 50/24* (2021.01)
*H01M 50/249* (2021.01)

(52) U.S. Cl.
CPC ....... *H01M 10/0525* (2013.01); *H01M 50/24* (2021.01); *H01M 50/249* (2021.01); *B60L 2200/10* (2013.01); *H01G 9/035* (2013.01); *H01G 9/04* (2013.01); *H01M 50/213* (2021.01); *H01M 2220/20* (2013.01)

(56) References Cited

U.S. PATENT DOCUMENTS

| | | | | |
|---|---|---|---|---|
| 2011/0282807 | A1* | 11/2011 | Colello | H02J 3/322 320/128 |
| 2018/0086472 | A1* | 3/2018 | Gore | H01M 50/10 |
| 2019/0165421 | A1* | 5/2019 | Linde | H01M 50/431 |
| 2019/0252655 | A1* | 8/2019 | Zimmermann | H01M 50/20 |
| 2019/0296300 | A1* | 9/2019 | Zimmermann | H01M 50/20 |
| 2020/0035967 | A1* | 1/2020 | Yoon | H01M 10/658 |
| 2020/0136135 | A1* | 4/2020 | Chavillon | H01M 4/8673 |
| 2020/0153066 | A1* | 5/2020 | Tajika | H01M 10/6571 |
| 2020/0194749 | A1* | 6/2020 | Ogata | H01M 50/213 |

OTHER PUBLICATIONS

Abstract of Thomas et al., "Multifunctional Structure-Battery Materials for Enhanced Performance in Small Unmanned Air Vehicles," The American Society of Mechanical Engineers, ASME 2003 International Mechanical Engineering Congress and Exposition, Nov. 15-21, 2003.

Asp et al., "Realisation of Structural Battery Composite Materials," 20th International Conference on Composite Materials, Copenhagen, Jul. 19-24, 2015.

Ritzert et al., "Structural Batteries for Hybrid Electric Propulsion System," NASA Aeronautics Research Institute, Jul. 10, 2013.

Thomas et al., "The Design and Application of Multifunctional Structure-Battery Materials Systems," JOM, 18-24, Mar. 2005.

* cited by examiner

STRUCTURALLY INTEGRATED ENERGY SUPPLY SYSTEMS FOR AIRCRAFT AND METHODS OF FORMING THE STRUCTURALLY INTEGRATED ENERGY SUPPLY SYSTEMS

FIELD

The present disclosure relates generally to structurally integrated energy supply systems for aircraft and/or to methods of forming the structurally integrated energy supply systems.

BACKGROUND

Aircraft increasingly utilize electrical energy to power energy-consuming systems of the aircraft, such as propulsors, navigational equipment, and/or convenience systems for the crew and/or passengers. With this in mind, it is becoming increasingly important to rapidly store electrical energy within the aircraft and/or to rapidly supply the stored electrical energy to the energy-consuming systems. However, the spatial and/or weight constraints inherent to aircraft design and/or operation may preclude the use of conventional energy-storage devices within the aircraft. These spatial and/or weight constraints also may limit an available quantity of stored electrical energy within the aircraft and/or may dictate that the conventional energy-storage devices be positioned, within the aircraft, a significant distance away from corresponding energy-consuming systems that utilize electrical energy provided by the conventional energy-storage devices. Thus, there exists a need for structurally integrated energy supply systems for aircraft and/or for methods of forming the structurally integrated energy supply systems.

SUMMARY

Structurally integrated energy supply systems for aircraft and methods of forming the structurally integrated energy supply systems are disclosed herein. The structurally integrated energy supply systems include an aircraft structural component, a cell array, and a plurality of energy-producing inserts. The aircraft structural component at least partially defines an interior region. The cell array includes a plurality of cell walls that defines a plurality of elongate cell volumes and is positioned within the interior region. Each energy-producing insert in the plurality of energy-producing inserts is positioned within a corresponding elongate cell volume in the plurality of elongate cell volumes and is configured to produce a corresponding insert electric current. The cell array provides structural load distribution to the aircraft structural component via the plurality of cell walls and contributes to a structural stiffness of the aircraft structural component.

The methods include providing an aircraft structural component and providing a cell array that includes a plurality of cell walls that defines a plurality of elongate cell volumes. The methods also include providing a plurality of energy-producing inserts. The methods further include positioning each energy-producing insert in the plurality of energy-producing inserts within a corresponding elongate cell volume in the plurality of elongate cell volumes.

DESCRIPTION

Figure 1:
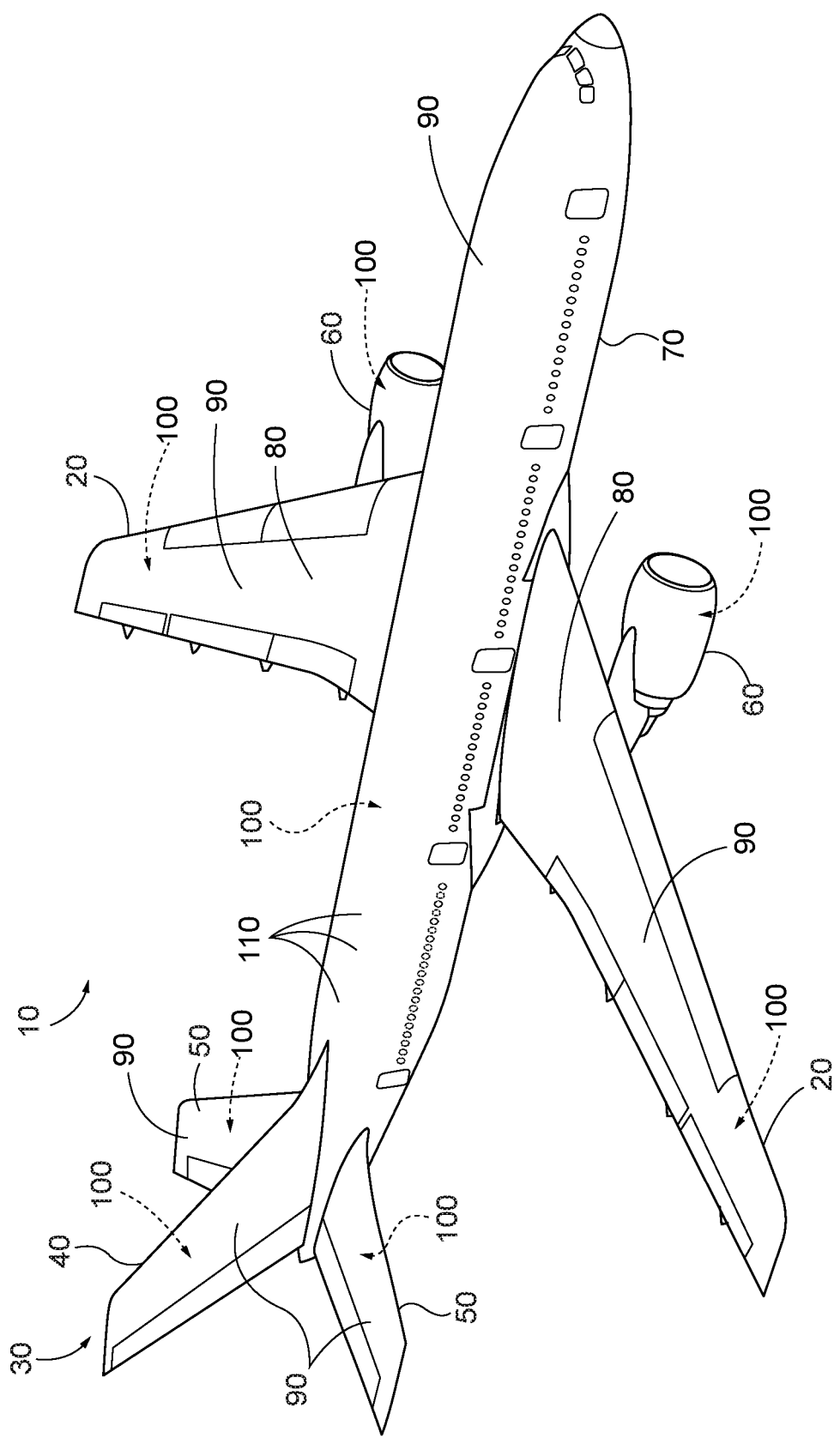
FIG. 1 is a schematic illustration of an aircraft that may include and/or utilize structurally integrated energy supply systems and/or that may be formed utilizing methods, according to the present disclosure.

FIGS. 1-9 provide illustrative, non-exclusive examples of aircraft 10, of structurally integrated energy supply systems 100, and/or of methods 200, according to the present disclosure. Elements that serve a similar, or at least substantially similar, purpose are labeled with like numbers in each of FIGS. 1-9, and these elements may not be discussed in detail herein with reference to each of FIGS. 1-9. Similarly, all elements may not be labeled in each of FIGS. 1-9, but reference numerals associated therewith may be utilized herein for consistency. Elements, components, and/or features that are discussed herein with reference to one or more of FIGS. 1-9 may be included in and/or utilized with any of FIGS. 1-9 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic illustration of an aircraft 10 that may include and/or utilize structurally integrated energy supply systems 100 and/or that may be formed utilizing methods 200, according to the present disclosure. Aircraft 10 may include a plurality of structural components 110, examples of which include a wing 20, a tail assembly 30, a vertical stabilizer 40, a horizontal stabilizer 50, an engine 60, a fuselage 70, a spar 80, and/or a skin 90, as well as subcomponents and/or sub-assemblies that may form and/or define one or more of these structural components. One or more structural components 110 of aircraft 10 may form a portion of a structurally integrated energy supply system 100, as discussed in more detail herein.

As discussed in more detail herein, structurally integrated energy supply systems 100 may be integrated into and/or may be integral with aircraft structural components 110. In addition, and as discussed, aircraft 10 may be spatially and/or weight-constrained. With this in mind, integration of structurally integrated energy supply systems 100 into necessary, or already present, aircraft structures may increase energy storage density, may decrease overall weight, and/or may decrease overall size of the structurally integrated energy supply systems, or of aircraft that include the structurally integrated energy supply systems, when compared to conventional energy-storage devices, or to conventional aircraft that include conventional energy-storage devices.

While not required of all embodiments, it may be beneficial to include structurally integrated energy supply systems 100 within aerodynamic lifting bodies of aircraft 10, such as wings 20. Doing so may decrease overall load bearing structural support needed by aircraft 10 when compared to conventional aircraft that might integrate conventional energy-storage devices into other structure(s) of the aircraft. Stated another way, positioning weight associated with structurally integrated energy supply systems 100 within the aerodynamic lifting bodies may decrease a weight of a remainder of the aircraft when compared to the conventional aircraft that integrate conventional energy-storage devices into the other stricture(s) of the aircraft.

Figure 2:
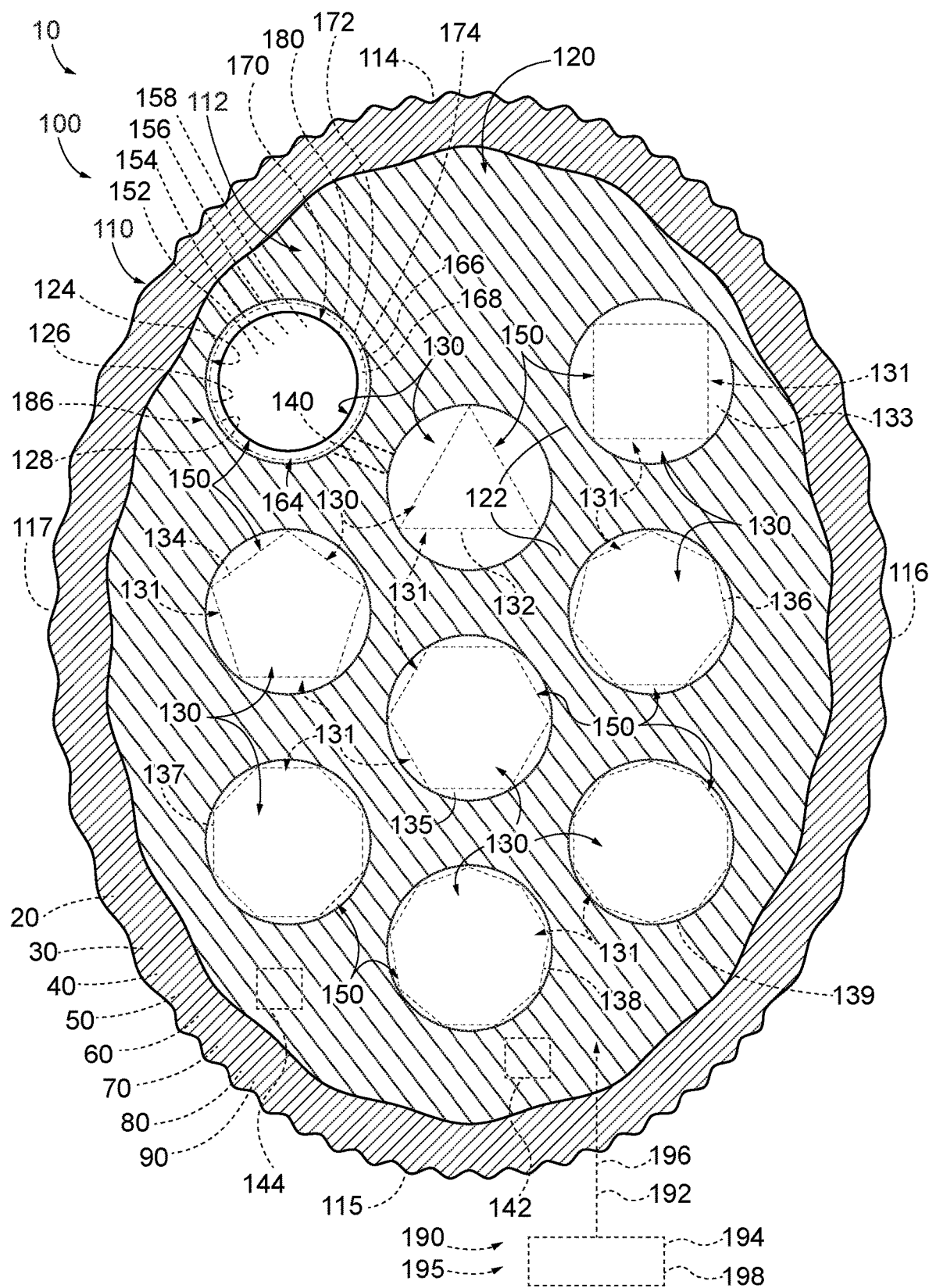
FIG. 2 is a schematic cross-sectional view illustrating examples of a structurally integrated energy supply system according to the present disclosure.
Figure 3:
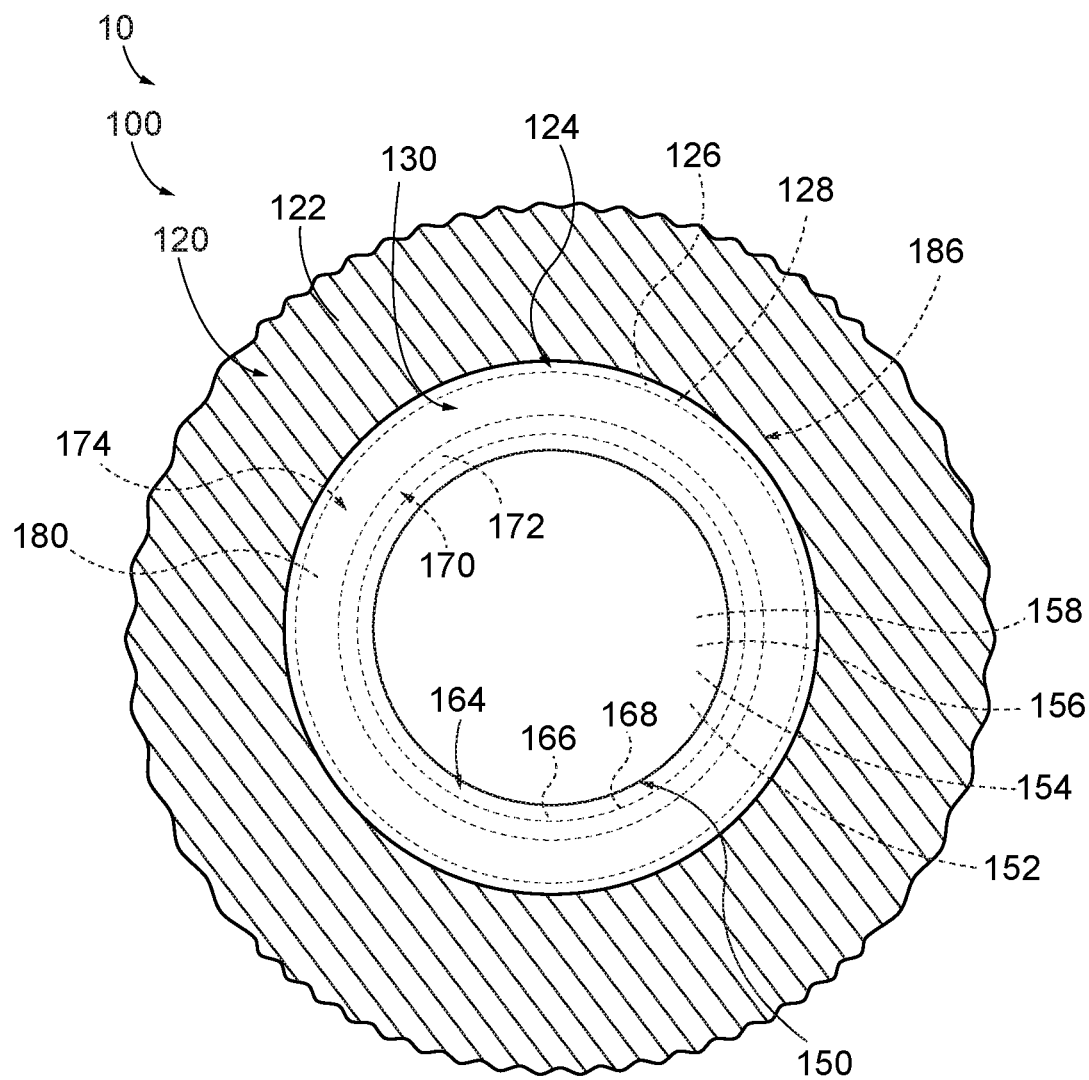
FIG. 3 is a more detailed view of a portion of the structurally integrated energy supply system of FIG. 2.
Figure 4:
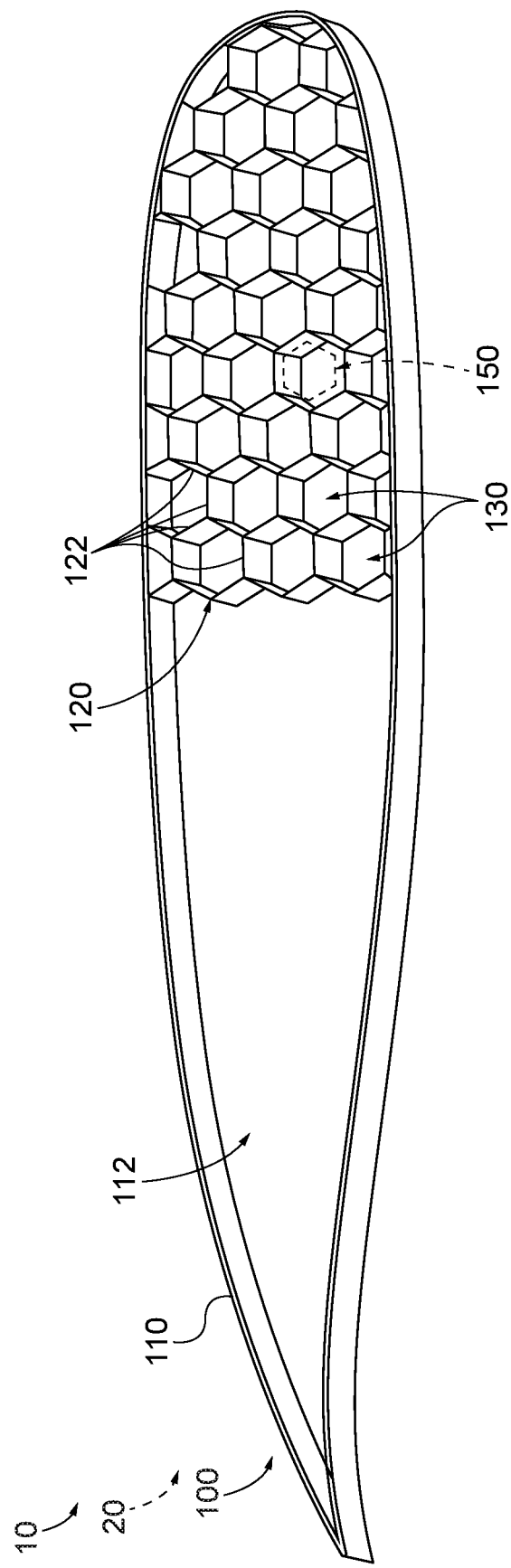
FIG. 4 is a less schematic cross-sectional view of a structurally integrated energy supply system according to the present disclosure.
Figure 5:
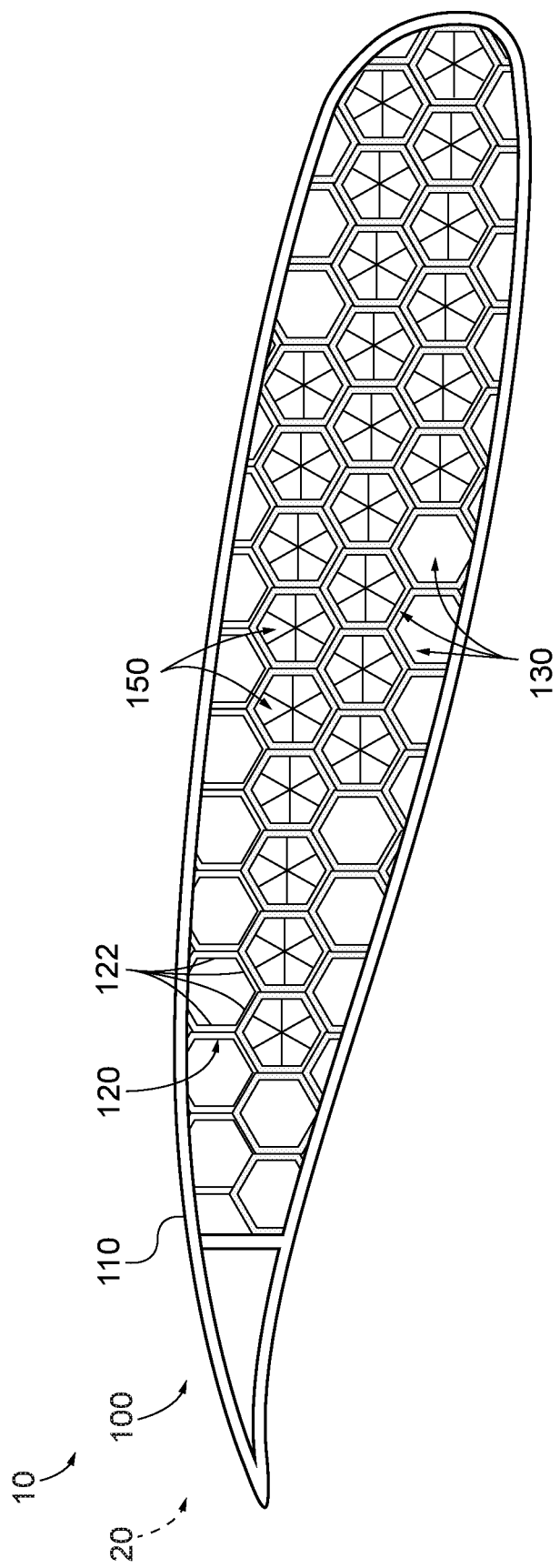
FIG. 5 is another less schematic cross-sectional view of a structurally integrated energy supply system according to the present disclosure.
Figure 6:
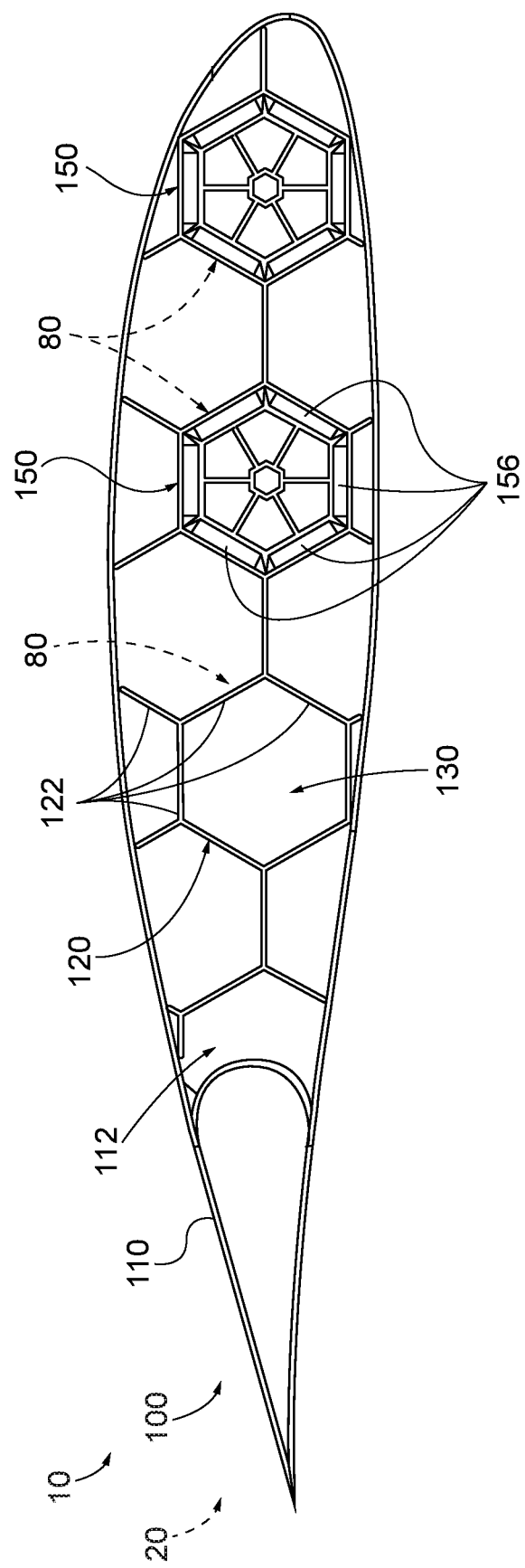
FIG. 6 is another less schematic cross-sectional view of a structurally integrated energy supply system according to the present disclosure.
Figure 7:
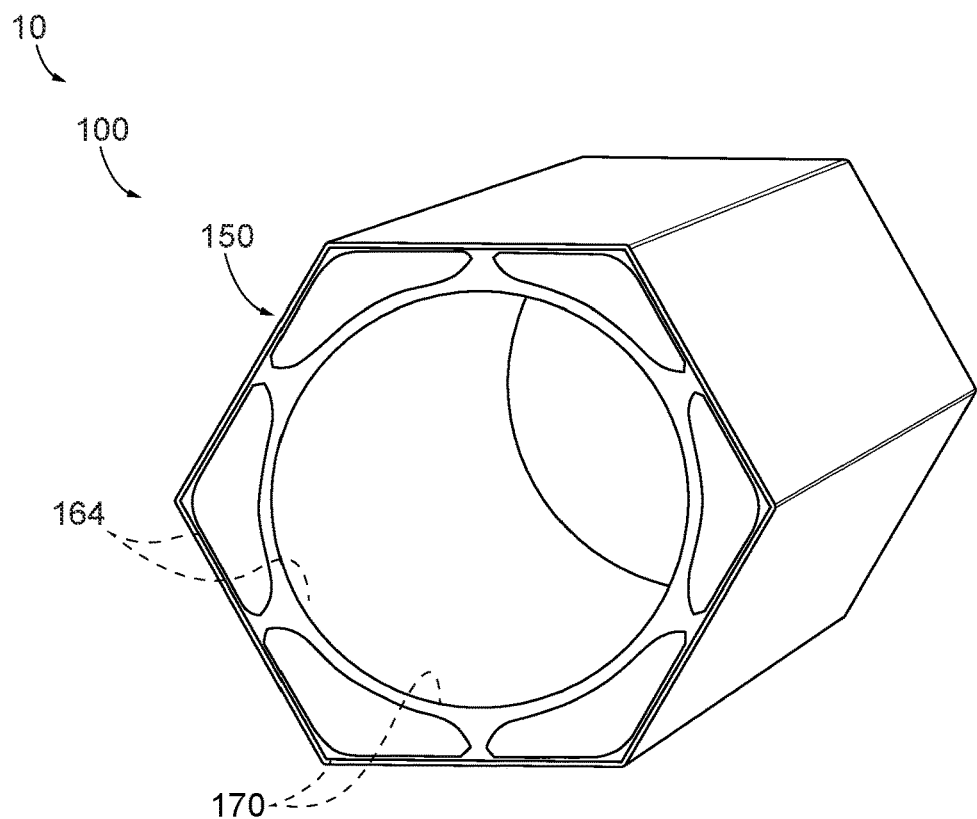
FIG. 7 is an example of an energy-producing insert that may be utilized with a structurally integrated energy supply system, according to the present disclosure.
Figure 8:
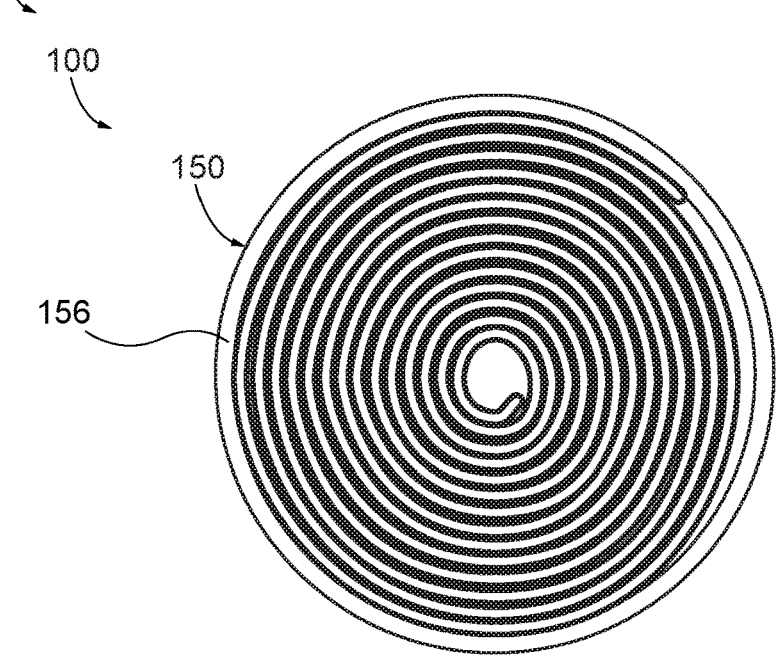
FIG. 8 is another example of an energy-producing insert that may be utilized with a structurally integrated energy supply system, according to the present disclosure.

FIG. 2 is a schematic cross-sectional view illustrating examples of a structurally integrated energy supply systems 100 according to the present disclosure, while FIG. 3 is a more detailed view of a portion of the structurally integrated energy supply systems 100 of FIG. 2. FIGS. 4-6 are less schematic cross-sectional views of structurally integrated energy supply systems 100, according to the present disclosure. FIGS. 7-8 are examples of energy-producing inserts 150 that may be utilized with structurally integrated energy supply systems 100, according to the present disclosure.

Structurally integrated energy supply systems 100 also may be referred to herein as energy supply systems 100 and/or as systems 100. As illustrated in FIGS. 2 and 4-6, systems 100 include an aircraft structural component 110, a cell array 120, and a plurality of energy-producing inserts 150. Aircraft structural component 110 at least partially defines, surrounds, encompasses, and/or encapsulates an interior region 112. Cell array 120 is positioned within interior region 112 and includes a plurality of cell walls 122 that defines a plurality of elongate cell volumes 130. In addition, cell array 120 provides structural load distribution, or support, via the plurality of cell walls 122 and/or to aircraft structural component 110. Each energy-producing insert 150 is positioned within a corresponding elongate cell volume 130 and is configured to produce and/or to generate a corresponding insert electric current.

As discussed, cell array 120 provides structural load distribution to aircraft structural component 110. Stated another way, cell array 120 contributes to, supplements, and/or increases a structural stiffness of aircraft structural component 110, such as may be relative to a similar aircraft structural component that does not enclose a cell array 120 according to the present disclosure. The inclusion of cell array 120 within and/or as a structural support to aircraft structural component 110 may provide several distinct benefits. As an example, the presence of cell array 120 within aircraft structural component 110 may increase a structural integrity of the aircraft structural component. As another example, the presence of energy-producing inserts 150 within elongate cell volumes 130 of cell array 120 may permit and/or facilitate electrical energy storage and/or electric current production from a region of aircraft 10 that conventionally is not, or cannot be, utilized for electrical energy storage and/or for electric current production. As yet another example, the integration of aircraft structural component 110, cell array 120, and energy-producing inserts 150, as illustrated in FIGS. 2-5 and discussed herein, may decrease an overall weight of aircraft 10, may decrease an overall volume of aircraft 10, may increase a payload capacity of aircraft 10, and/or may decrease spatial and/or weight constraints within aircraft 10 when compared to conventional aircraft that do not include structural integrated energy supply systems 100 according to the present disclosure.

In one example, and as illustrated in FIGS. 2-3, cell array 120 may include an electrically conductive cell coating 124. Electrically conductive cell coating 124 may be defined by a cell coating material 126 and defines a plurality of cell electrodes 128. Each cell electrode 128 may be supported by corresponding cell walls 122 and/or may at least partially define a corresponding elongate cell volume 130.

In this example, and with continued reference to FIGS. 2-3, energy-producing inserts 150 may include an electrically conductive insert coating 164. Electrically conductive insert coating 164 may be defined by an insert coating material 166, may coat an external surface of energy-producing inserts 150, and/or may define a corresponding insert electrode 168. As discussed in more detail herein, insert coating material 166 may differ from cell coating material 126.

Also in this example, and with continued reference to FIGS. 2-3, energy-producing inserts 150 may include an ion-permeable coating 170 that is defined by an electrically insulating ion-permeable material 172. Ion-permeable coating 170 may coat and/or cover electrically conductive cell coating material 126 and/or may electrically separate insert electrode 168 and cell electrode 128. Ion-permeable coating 170 may function as, may define, and/or may be an ion host for energy-producing inserts 150. System 100 also may include an electrolyte material 180. Electrolyte material 180, when present, may include any suitable solid and/or liquid electrolyte material and may include ions dissolved in a solvent. Electrolyte material 180 may contact, physically contact, fluidly contact, and/or electrically contact each cell electrode 128 and a corresponding insert electrode 168 and may provide, permit, and/or facilitate ion transport between the corresponding insert electrode and the cell electrode.

Corresponding insert electrode 168 and electrolyte material 180 together may define an insert half-cell potential. Similarly, each cell electrode 128 and electrolyte material 180 together may define a cell half-cell potential. The insert half-cell potential may differ from the cell half-cell potential, such as may be caused by the difference between insert coating material 166 and cell coating material 126, as discussed herein. Corresponding insert electrode 168, electrolyte material 180, and cell electrode 128 together may be referred to herein as defining an electrochemical cell 186.

Insert coating material 166 may include any suitable electrically conductive insert coating material, such as a metallic insert coating material. Similarly, cell coating material 126 may include any suitable electrically conductive cell coating material, such as a metallic cell coating material. In a specific example, the ions may include and/or be lithium ions. In this specific example, cell coating material 126 may include and/or be copper and corresponding cell electrode 128 may include and/or be a positive electrode of electrochemical cell 186. In addition, insert coating material 166 may include and/or be aluminum and corresponding insert electrode 168 may include and/or be a negative electrode of electrochemical cell 186.

Ion-permeable coating 170 may include any suitable electrically insulating ion-permeable material 172 that may coat electrically conductive coating 124 and/or that may electrically separate electrically conductive cell coating 124 from electrically conductive insert coating 164. As an example, electrically insulating ion-permeable material 172 may include a barrier material that spatially separates each energy-producing insert 150 from the plurality of cell walls 122 and/or from the plurality of cell electrodes 128. As another example, electrically insulating ion-permeable material 172 may include and/or be an ion-permeable ceramic.

Cell array 120 may include any suitable structure, material, and/or materials that may include and/or define cell walls 122 that define elongate cell volumes 130, that may be positioned within interior region 112 of aircraft structural component 110, and/or that may provide structural load distribution via cell walls 122 to aircraft structural component 110. In general, cell array 120 may include and/or be an electrically insulating material. Stated another way, cell array 120 may include and/or be an electrical insulator that electrically isolates at least a first subset of the plurality of energy-producing inserts 150 from a second subset of the plurality of energy-producing inserts 150. However, this is not required of all embodiments. Examples of materials that may define cell array 120 include any suitable polymer, polymeric material, dielectric material, composite material, composite fiber, resin material, thermoset composite, and/or thermoplastic composite. Additional examples of materials that may define cell array 120 include composite materials conventionally utilized in aircraft fabrication.

Elongate cell volumes 130 may have and/or define any suitable shape, or transverse cross-sectional shape. As an example, elongate cell volumes 130 may include a plurality of elongate polygonal 131 cell volumes. As a more specific example, elongate cell volumes 130 may include a plurality of elongate triangular 132 cell volumes. As another more specific example, elongate cell volumes 130 may include a plurality of elongate rectangular 133 cell volumes. As another more specific example, elongate cell volumes 130 may include a plurality of elongate pentagonal 134 cell volumes. As another more specific example, elongate cell volumes 130 may include a plurality of elongate hexagonal, or honeycomb-shaped, 135 cell volumes. As another more specific example, elongate cell volumes 130 may include a plurality of elongate heptagonal 136 cell volumes. As another more specific example, elongate cell volumes 130 may include a plurality of elongate octagonal 137 cell volumes. As another more specific example, elongate cell volumes 130 may include a plurality of elongate nonagonal 138 cell volumes. As another more specific example, elongate cell volumes 130 may include a plurality of elongate decagonal 139 cell volumes. As illustrated, elongate cell volumes 130 also may be circular in transverse cross-section and/or cylindrical in shape.

As discussed, cell array 120 provides structural load distribution to aircraft structural component 110 via cell walls 122. As also discussed, cell array 120 contributes to a structural stiffness of aircraft structural component 110. As an example, and as illustrated in FIG. 2, aircraft structural component 110 may define a first external surface 114, a second external surface 115, a third external surface 116, and/or a fourth external surface 117. At least a region of first external surface 114 and a corresponding region of second external surface 115 may face away from one another and/or may face in opposite directions, and cell array 120 may provide load distribution that increases a structural stiffness of aircraft structural component 110 when measured in a direction that extends between the region of first external surface 114 and the corresponding region of second external surface 115. Similarly, at least a least a region of third external surface 116 and a corresponding region of fourth external surface 117 may face away from one another and/or may face in opposite directions and also may face perpendicular to first external surface 114 and/or to second external surface 115. Cell array 120 may provide load distribution that increases a structural stiffness of aircraft structural component 110 when measured in a direction that extends between the region of third external surface 116 and the corresponding region of fourth external surface 117.

Stated another way, cell walls 122 may define a plurality of polygonal 131 shaped elongate cell volumes 130 that form a lattice, a matrix, a framework, a mesh, and/or a web structure. The lattice structure may provide load distribution via cell walls 122, to aircraft structural component 110.

As illustrated in dashed lines in FIG. 2, cell array 120 may include a fluid supply system 195. Fluid supply system 195, when present, may include a fluid source 198 and/or be configured to provide a fluid stream 196 to at least a subset of the plurality of elongate cell volumes 130 and/or to at least a subset of the energy-producing inserts 150. Fluid stream 196 may include and/or be any suitable fluid stream. As an example, fluid stream 196 may include and/or be a coolant stream configured to cool cell array 120. As another example, and as discussed in more detail herein, fluid stream 196 may include and/or be a reactant stream 192 that is supplied to energy-producing inserts 150. Under these conditions, fluid supply system 195 also may be referred to herein as a reactant supply system 190 and fluid source 198 may be referred to herein as a reactant source 194. Reactant stream 192 may be configured to react, with and/or within elongate cell volumes 130 and/or energy-producing inserts 150, to produce and/or generate the corresponding insert electric current.

As also illustrated in dashed lines in FIG. 2, cell array 120 may include a plurality of electrical conductors 140. Electrical conductors 140, when present, may be configured to electrically interconnect at least a subset of the plurality of energy-producing inserts 150. As also illustrated in dashed lines in FIG. 2, cell array 120 may include an embedded electronic structure 142. Examples of embedded electronic structure 142 include a voltage detection circuit, a current detection circuit, a transistor, and/or a microprocessor. The voltage detection circuit may be configured to detect a voltage generated by one or more energy-producing inserts 150. Similarly, the current detection circuit may be configured to detect an electric current generated by one or more energy-producing inserts 150. The transistor may be configured to control and/or to regulate electric current flow from one or more energy-producing inserts 150. The microprocessor may be programmed to monitor system 100 and/or to control the operation of at least a portion of system 100.

As illustrated in dashed lines in FIG. 2, cell array 120 may include a thermal mitigation structure 144. Thermal mitigation structure 144, when present, may be configured to regulate a temperature of energy-producing inserts 150. As an example, thermal mitigation structure 144 may include a phase change material configured to undergo a phase change to regulate the temperature of energy-producing inserts 150. As another example, thermal mitigation structure 144 may include a flow-regulating device configured to regulate a flow rate of the coolant stream. An example of the flow-regulating device includes a self-actuated thermostatic and/or bi-metallic strip.

Energy-producing inserts 150 may include any suitable structure that may be positioned within elongate cell volumes 130 and/or that may be configured to produce the corresponding insert electric current. This may include production of the corresponding insert electric current solely by structure that is internal to energy-producing inserts 150 and/or production of the corresponding insert electric current via a combination of structures, some of which may be attached to and/or defined by cell array 120 and/or by another component of system 100, as discussed in more detail herein. With this in mind, energy-producing inserts 150 also may be referred to herein as electric current sources 150, as current sources 150, and/or as electrical energy sources 150.

It is within the scope of the present disclosure that energy-producing inserts 150 may include and/or be modular energy-producing inserts 150. Stated another way, at least a subset of energy-producing inserts 150 may be identical and/or interchangeable.

An example of energy-producing inserts 150 includes energy-storage devices 152. Examples of energy-storage devices 152 include batteries 156 and/or capacitors 158. Batteries 156, when present, may include and/or be any suitable batteries, examples of which include off-the-shelf, or conventional, batteries, rechargeable batteries, lithium ion batteries, jelly roll batteries, and/or spiral-wound batteries.

Another example of energy-producing inserts 150 includes electrolytic energy-producing inserts 154. Electrolytic energy-producing inserts 154 may be configured to electrochemically produce the corresponding insert electric current from a reactant stream, such as reactant stream 192 that is discussed herein.

It is within the scope of the present disclosure that energy-producing inserts 150 may be tapered and/or may be referred to herein as tapered energy-producing inserts 150. Tapered energy-producing inserts 150 may be shaped to define an interference fit with cell volumes 130, such as to keep and/or to retain tapered energy-producing inserts 150 within corresponding cell volumes 130. Stated another way, in systems 100 that include tapered energy-producing inserts 150, cell array 120 may apply a force, or a pressure, to the tapered energy-producing inserts. The applied force, or pressure, may retain tapered energy-producing inserts 150 within cell volumes 130. Additionally or alternatively, the applied force, or pressure, may press against and/or may compress at least a region of each tapered energy-producing insert 150. This force, or pressure, may be beneficial for the operation of tapered energy-producing inserts 150. As an example, and when tapered energy-producing inserts 150 include layered batteries 156, the applied force, or pressure, may provide layer-to-layer compression within the battery, which may improve layer contact, may decrease a potential for gas formation between adjacent layers of the battery, and/or may improve operation and/or an operational lifetime of the battery. It is within the scope of the present disclosure that the applied force, or pressure, may be constant, or at least substantially constant. Alternatively, the applied force, or pressure, may be selectively applied and/or may be selectively released. As an example, the applied force, or pressure, may be selectively applied during charging and may not be applied during discharging of batteries 156.

Energy-producing inserts 150 may include and/or may be formed and/or defined by any suitable material and/or materials. As examples, energy-producing inserts 150 may be defined by a metallic insert material, a plastic insert material, and/or a composite insert material. As a more specific example, energy-producing inserts 150 may be defined by a dielectric solid coated by an electrically conductive coating. Examples of the electrically conductive coating are disclosed herein with reference to electrically conductive insert coating 164.

Energy-producing inserts 150 may have and/or define any suitable shape and/or transverse cross-sectional shape. In general, the shape of energy-producing inserts 150 will correspond to and/or will be configured to mate with the shape of elongate cell volumes 130. With this in mind, energy-producing inserts 150 may include and/or may be referred to herein as elongate polygonal energy-producing inserts 150, elongate triangular energy-producing inserts 150, elongate rectangular energy-producing inserts 150, elongate pentagonal energy-producing inserts 150, elongate hexagonal, or honeycomb-shaped, energy-producing inserts 150, elongate heptagonal energy-producing inserts 150, elongate octagonal energy-producing inserts 150, elongate nonagonal energy-producing inserts 150, elongate decagonal energy-producing inserts 150, elongate circular energy-producing inserts 150, and/or cylindrical energy-producing inserts 150. An example of an elongate hexagonal energy-producing insert 150 that may include an electrically conductive insert coating 164 and/or an ion-permeable coating 170 is illustrated in FIG. 7. An example of a cylindrical energy-producing insert 150, in the form of a jelly roll battery 156, is illustrated in FIG. 8.

As illustrated in dashed lines in FIGS. 2-3, system 100 may include a plurality of ion transport membranes 174. Ion transport membranes 174, when present, may encircle energy-producing inserts 150 and/or may electrically separate energy-producing inserts 150 from cell array 120. Ion transport membranes 174 may be configured to facilitate ion transport between energy-producing inserts 150, or insert electrode 168 thereof, and cell array 120, or cell electrode 128 thereof. Ion transport membranes 174 may perform a function that is similar to that of ion-permeable coating 170, and ion transport membranes 174 may be included within system 100 in addition to and/or in place of ion-permeable coating 170.

As discussed herein with reference to FIG. 1, structurally integrated energy supply systems 100 may form a portion of and/or may be included in an aircraft 10. It is within the scope of the present disclosure that systems 100 may be incorporated into and/or may form a portion of any suitable aircraft structural component 110 of aircraft 10. As an example, an as illustrated in FIGS. 1, and 4-6, aircraft structural component 110 may include a wing 20 of aircraft 10, and cell array 120 may be structurally integrated with and/or within wing 20. Under these conditions, and although not required of all embodiments, a longitudinal axis of elongate cell volumes 130 may extend parallel, or at least substantially parallel, to a length, or to a span-wise direction, of wing 20.

As illustrated in FIG. 4, elongate cell volumes 130 and/or energy-producing inserts 150 may extend within a threshold fraction of a transverse cross-section of wing 20. Examples of the threshold fraction include at least 20%, at least 30%, at least 40%, at least 50%, at least 60%, at least 70%, at least 80%, at least 90, at most 90%, at most 80%, at most 70%, at most 60%, at most 50%, at most 40%, at most 30%, at most 20%, and/or at least substantially 100%. As an example, and as illustrated in FIG. 4, elongate cell volumes 130 may extend within, or only within, a forward region of wing 20. As another example, and as illustrated in FIG. 5, elongate cell volumes 130 may extend within all, or substantially all, of wing 20; however, energy-producing inserts 150 only may extend within a subset of elongate cell volumes 130. A region of wing 20 that includes elongate cell volumes 130 and/or that includes elongate cell volumes 130 with included energy-producing inserts 150 may be selected based upon structural integrity, electrical energy storage density, weight, and/or center-of-gravity considerations for aircraft 10.

As another example, and as illustrated in FIG. 6, elongate cell volumes 130 may extend within and/or may define a spar 80 of aircraft 10. Under these conditions, cell array 120 may be structurally integrated within and/or may define spar 80. FIG. 6 illustrates energy-producing inserts 150 extending within only a subset of spars 80. In addition, FIG. 6 illustrates energy-producing inserts 150 as including a plurality of batteries 156, which may include and/or be flat, planar, layered, and/or commercial off the shelf batteries 156. Elongate cell volumes 130 extend at least substantially parallel to a longitudinal axis of spar 80.

Returning to FIG. 1, and as discussed, aircraft structural component 110 may include skin 90 of aircraft 10. Under these conditions, cell array 120 may be structurally integrated with skin 90, and a longitudinal axis of elongate cell volumes 130 may extend at least substantially parallel to an exposed surface of skin 90.

Figure 9:
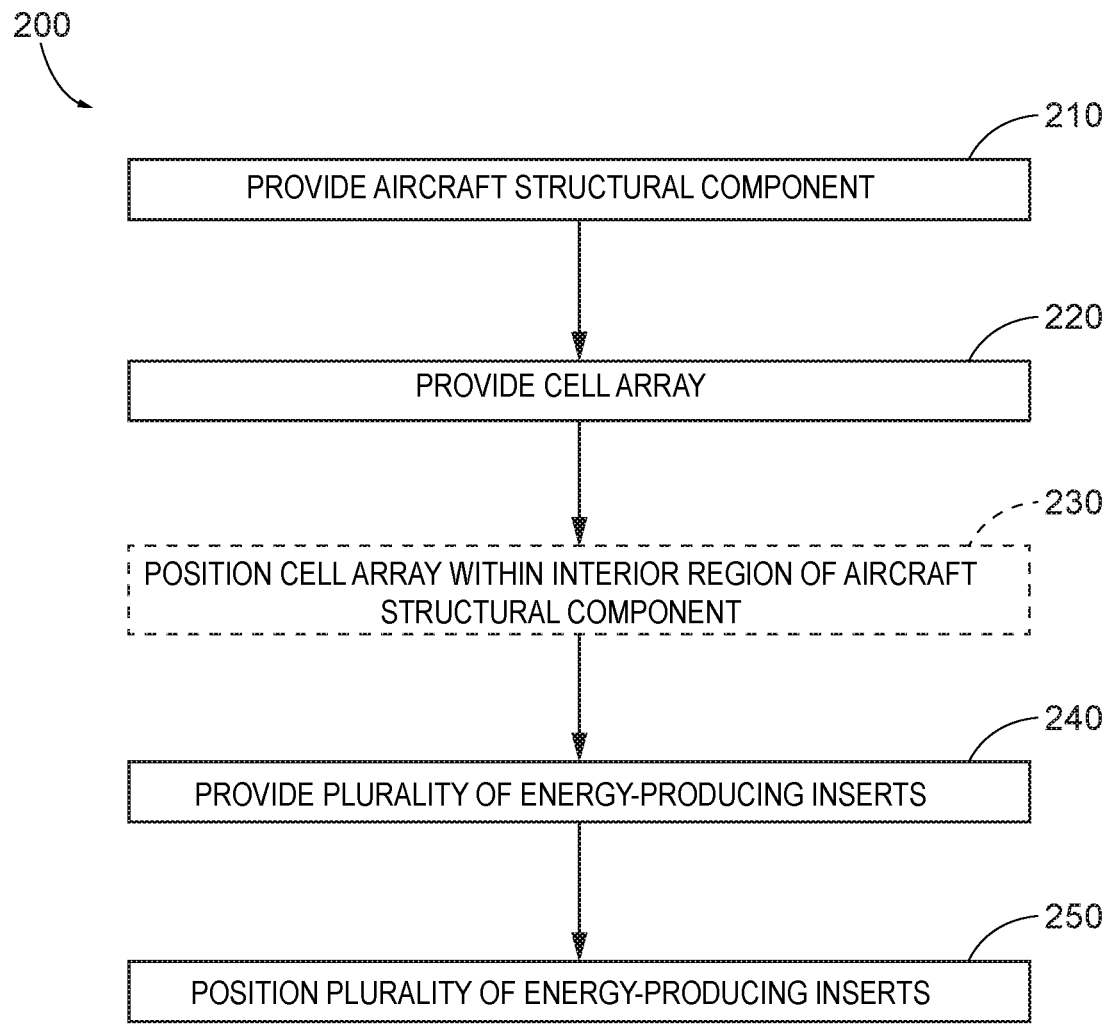
FIG. 9 is a flowchart depicting methods of forming a structurally integrated energy supply system, according to the present disclosure.

FIG. 9 is a flowchart depicting methods 200 of forming a structurally integrated energy supply system, according to the present disclosure, such as structurally integrated energy supply system 100 of FIGS. 1-8. Methods 200 include providing an aircraft structural component at 210 and providing a cell array at 220. Methods 200 may include positioning the cell array within an interior region of the aircraft structural component at 230. Methods 200 also include providing a plurality of energy-producing inserts at 240 and positioning the plurality of energy-producing inserts at 250.

Providing the aircraft structural component at 210 may include providing any suitable aircraft structural component that at least partially defines the interior region. Examples of the aircraft structural component are disclosed herein with reference to aircraft structural component 110 of FIGS. 1 and 3-8. Examples of the interior region are disclosed herein with reference to interior region 112 of FIGS. 1 and 3-8.

Providing the cell array at 220 may include providing any suitable cell array. The cell array may include a plurality of cell walls that defines a plurality of elongate cell volumes. The cell array is positioned within the interior region of the aircraft structural component and provides structural load distribution to the aircraft structural component such that the cell array contributes to a structural stiffness of the aircraft structural component. The structural load distribution is through and/or via the plurality of cell walls. Examples of the cell array are disclosed herein with reference to cell array 120 of FIGS. 2-8. Examples of the plurality of cell walls are disclosed herein with reference to cell walls 122 of FIGS. 2-8.

The cell array may form a portion of, may be integral with, and/or may be formed concurrently with the aircraft structural component. Under these conditions, the providing at 210 and the providing at 220 may be performed simultaneously, concurrently, and/or at least partially concurrently. Additionally or alternatively, the cell array may be distinct from and/or may be formed separately from the aircraft structural component. Under these conditions, methods 200 further may include positioning the cell array within the interior region of the aircraft structural component at 230. The positioning at 230 may be performed with any suitable timing and/or sequence during methods 200. As examples, the positioning at 230 may be performed prior to the positioning at 250, subsequent to the positioning at 250, and/or at least partially concurrently with the positioning at 250.

Providing the plurality of energy-producing inserts at 240 may include providing any suitable plurality of energy-producing inserts, each of which is configured to produce a corresponding insert electric current. Examples of the plurality of energy-producing inserts are disclosed herein with reference to energy-producing inserts 150 of FIGS. 2-8.

Positioning the plurality of energy-producing inserts at 250 may include positioning each energy-producing insert in the plurality of energy-producing inserts within a corresponding elongate cell volume in the plurality of elongate cell volumes.

Illustrative, non-exclusive examples of inventive subject matter according to the present disclosure are described in the following enumerated paragraphs:

A1. A structurally integrated energy supply system (100) for an aircraft (10), the system (100) comprising:
an aircraft structural component (110) that at least partially defines an interior region (112);
a cell array (120) that includes a plurality of cell walls (122) that defines a plurality of elongate cell volumes (130), wherein the cell array (120) is positioned within the interior region (112); and a plurality of energy-producing inserts (150), wherein each energy-producing insert (150) in the plurality of energy-producing inserts (150) is positioned within a corresponding elongate cell volume (130) in the plurality of elongate cell volumes (130) and is configured to produce a corresponding insert electric current;
wherein the cell array (120) provides structural load distribution, via the plurality of cell walls (122), to the aircraft structural component (110) such that the cell array (120) contributes to a structural stiffness of the aircraft structural component (110).

A2. The system (100) of paragraph A1, wherein:
(i) the cell array (120) includes an electrically conductive cell coating (124) that is defined by a cell coating material (126), wherein the electrically conductive cell coating (124) defines a plurality of cell electrodes (128), and further wherein each cell electrode (128) in the plurality of cell electrodes (128) at least partially defines a corresponding elongate cell volume (130) in the plurality of elongate cell volumes (130);
(ii) each energy-producing insert (150) includes an electrically conductive insert coating (164) that coats an external surface thereof and is defined by an insert coating material (166), wherein the electrically conductive insert coating (164) defines a corresponding insert electrode (168), and further wherein the insert coating material (166) differs from the cell coating material (126); and
(iii) each energy-producing insert (150) includes an ion-permeable coating (170) that is defined by an electrically insulating ion-permeable material (172), wherein the ion-permeable coating (170) coats the electrically conductive cell coating (124).

A3. The system (100) of paragraph A2, wherein the ion-permeable coating (170) electrically separates the corresponding insert electrode (168) of each energy-producing insert (150) from a corresponding cell electrode (128) in the plurality of cell electrodes (128).

A4. The system (100) of any of paragraphs A2-A3, wherein the ion-permeable coating (170) defines an ion host for the energy-producing insert (150).

A5. The system (100) of any of paragraphs A2-A4, wherein the system (100) further includes an electrolyte material (180) that includes ions dissolved in a solvent, wherein the electrolyte material (180) electrically contacts the plurality of cell electrodes (128) and the corresponding insert electrode (168) and facilitates transport of the ions between the corresponding insert electrode (168) of each energy-producing insert (150) and a corresponding cell electrode (128) in the plurality of cell electrodes.

A6. The system (100) of paragraph A5, wherein the corresponding insert electrode (168) and the electrolyte material (180) together define an insert half-cell potential, wherein the corresponding cell electrode (128) and the electrolyte material (180) together define a cell half-cell potential, and further wherein the insert half-cell potential differs from the cell half-cell potential.

A7. The system (100) of any of paragraphs A5-A6, wherein:

the ions include lithium ions;

the cell coating material (126) includes copper and the corresponding cell electrode (128) is a positive electrode of an electrochemical cell (186) that includes the corresponding cell electrode (128), the electrolyte material (180), and the corresponding insert electrode (168); and the insert coating material (166) includes aluminum and the corresponding insert electrode (168) is a negative electrode of the electrochemical cell.

A8. The system (100) of paragraph A7, wherein the plurality of elongate cell volumes (130) includes a plurality of elongate hexagonal cell volumes.

A9. The system (100) of any of paragraphs A2-A8, wherein the insert coating material (166) includes at least one of:

(i) an electrically conductive insert coating material (166);
(ii) a metallic insert coating material (166); and
(iii) an aluminum insert coating material (166).

A10. The system (100) of any of paragraphs A2-A9, wherein the cell coating material (126) includes at least one of:

(i) an electrically conductive cell coating material (126);
(ii) a metallic cell coating material (126); and
(iii) a copper cell coating material (126).

A11. The system (100) of any of paragraphs A2-A10, wherein the electrically insulating ion-permeable material (172) includes at least one of:

(i) a barrier material that spatially separates each energy-producing insert (150) from the plurality of cell walls (122); and
(ii) an ion-permeable ceramic.

A12. The system (100) of any of paragraphs A1-A11, wherein the plurality of energy-producing inserts (150) includes a plurality of modular energy-producing inserts (150).

A13. The system (100) of any of paragraphs A1-A12, wherein each energy-producing insert (150) in the plurality of energy-producing inserts (150) includes a corresponding insert electrode (168).

A14. The system (100) of paragraph A13, wherein the corresponding insert electrode (168) includes at least one of aluminum and an aluminum alloy.

A15. The system (100) of any of paragraphs A1-A14, wherein the plurality of energy-producing inserts (150) includes a plurality of energy-storage devices (152).

A16. The system (100) of any of paragraphs A1-A15, wherein the plurality of energy-producing inserts (150) includes a plurality of capacitors (158).

A17. The system (100) of any of paragraphs A1-A16, wherein the plurality of energy-producing inserts (150) includes a plurality of batteries (156).

A18. The system (100) of paragraph A17, wherein the plurality of batteries (156) includes at least one of a plurality of jelly roll batteries (156) and a plurality of spiral-wound batteries (156).

A19. The system (100) of any of paragraphs A17-A18, wherein the plurality of batteries (156) includes a plurality of lithium ion batteries (156).

A20. The system (100) of any of paragraphs A1-A19, wherein the plurality of energy-producing inserts (150) at least partially defines a plurality of electrolytic energy-producing inserts (154), wherein each electrolytic energy-producing insert (154) in the plurality of electrolytic energy-producing inserts (154) is configured to electrochemically produce the corresponding insert electric current from a reactant stream (192).

A21. The system (100) of paragraph A20, wherein the structurally integrated energy supply system (100) further includes a reactant supply system (190) configured to provide the reactant stream (192) to the plurality of electrolytic energy-producing inserts (154).

A22. The system (100) of any of paragraphs A20-A21, wherein the structurally integrated energy supply system (100) further includes a reactant source (194) configured to provide the reactant stream (192) to the plurality of electrolytic energy-producing inserts (154).

A23. The system (100) of any of paragraphs A1-A11, wherein the plurality of energy-producing inserts (150) includes a plurality of tapered energy-producing inserts (150).

A24. The system (100) of paragraph A23, wherein each tapered energy-producing insert (150) in the plurality of tapered energy-producing inserts (150) is shaped to define an interference fit with the corresponding elongate cell volume (130).

A25. The system (100) of any of paragraphs A1-A24, wherein the plurality of energy-producing inserts (150) includes a plurality of coated energy-producing inserts (150) coated with an insert coating material (166).

A26. The system (100) of paragraph A25, wherein the insert coating material (166) includes at least one of aluminum and an aluminum alloy.

A27. The system (100) of any of paragraphs A25-A26, wherein the insert coating material (166) includes an ion-permeable material.

A28. The system (100) of paragraph A27, wherein the ion-permeable material includes an ion-permeable ceramic.

A29. The system (100) of any of paragraphs A1-A28, wherein the plurality of energy-producing inserts (150) is defined by at least one of:

(i) a metallic insert material;
(ii) a plastic insert material;
(iii) a composite insert material; and
(iv) a dielectric solid coated by an electrically conductive insert coating (164).

A30. The system (100) of any of paragraphs A1-A29, wherein the plurality of elongate cell volumes (130) defines at least one of:

(i) a plurality of elongate polygonal (131) cell volumes;
(ii) a plurality of elongate triangular (132) cell volumes;
(iii) a plurality of elongate rectangular (133) cell volumes;
(iv) a plurality of elongate pentagonal (134) cell volumes;
(v) a plurality of elongate hexagonal (135) cell volumes;
(vi) a plurality of elongate heptagonal (136) cell volumes;
(vii) a plurality of elongate octagonal (137) cell volumes;
(viii) a plurality of elongate nonagonal (138) cell volumes; and
(ix) a plurality of elongate decagonal (139) cell volumes.

A31. The system (100) of any of paragraphs A1-A30, wherein the aircraft structural component (110) defines a first external surface (114) and a second external surface (115), wherein a region of the first external surface (114) and a corresponding region of the second external surface (115) face in opposite directions, and further wherein the cell array (120) provides load distribution that increases a structural stiffness of the aircraft structural component (110) when measured in a direction that extends between the region of the first external surface (114) and the corresponding region of the second external surface (115).

A32. The system (100) of paragraph A31, wherein the aircraft structural component (110) defines a third external surface (116) and a fourth external surface (117), wherein a region of the third external surface (116) and a corresponding region of the fourth external surface (117) face in opposite directions, wherein the region of the third external surface (116) and the corresponding region of the fourth external surface (117) face perpendicular to the region of the first external surface (114) and the corresponding region of the second external surface (115), and further wherein the cell array (120) provides load distribution that increases a structural stiffness of the aircraft structural component (110) when measured in a direction that extends between the region of the third external surface (116) and the corresponding region of the fourth external surface (117).

A33. The system (100) of any of paragraphs A1-A32, wherein the plurality of cell walls (122) defines a plurality of polygonal (131) shaped elongate cell volumes (130) forming a lattice structure that provides load distribution, through the plurality of cell walls (122), to the aircraft structural component (110).

A34. The system (100) of any of paragraphs A1-A33, wherein the cell array (120) further includes a fluid supply system (195) configured to provide a fluid stream (196) to at least a subset of the plurality of elongate cell volumes (130).

A35. The system (100) of paragraph A34, wherein the fluid stream (196) includes a/the reactant stream (192) configured to react, within the plurality of energy-producing inserts (150), to generate the corresponding insert electric current.

A36. The system (100) of any of paragraphs A1-A35, wherein the fluid stream (196) includes a coolant stream configured to cool cell array (120).

A37. The system (100) of any of paragraphs A1-A36, wherein the cell array (120) includes a plurality of electrical conductors (140) configured to electrically interconnect at least a subset of the plurality of energy-producing inserts (150).

A38. The system (100) of any of paragraphs A1-A37, wherein the cell array (120) includes at least one embedded electronic structure (142).

A39. The system (100) of any of paragraphs A1-A38, wherein the cell array (120) includes a thermal mitigation structure (144) configured to regulate a temperature of the plurality of energy-producing inserts (150).

A40. The system (100) of paragraph A39, wherein the thermal mitigation structure (144) includes a phase change material configured to undergo a phase change to regulate the temperature of the plurality of energy-producing inserts (150).

A41. The system (100) of any of paragraphs A39-A40, wherein the thermal mitigation structure (144) includes at least one self-actuated thermostatic bi-metallic strip configured to regulate a flow rate of a/the coolant stream.

A42. The system (100) of any of paragraphs A1-A41, wherein the cell array (120) includes an electrically conductive cell coating (124) that at least partially defines the plurality of elongate cell volumes (130).

A43. The system (100) of paragraph A42, wherein the electrically conductive cell coating (124) includes at least one of copper and a copper alloy.

A44. The system (100) of any of paragraphs A1-A43, wherein the cell array (120) includes a plurality of cell electrodes (128), wherein each cell electrode (128) in the plurality of cell electrodes (128) at least partially defines a corresponding elongate cell volume (130) in the plurality of elongate cell volumes (130).

A45. The system (100) of any of paragraphs A1-A44, wherein the cell array (120) includes an electrical insulator that electrically isolates at least a first subset of the plurality of energy-producing inserts (150) from at least a second subset of the plurality of energy-producing inserts (150).

A46. The system (100) of any of paragraphs A1-A45, wherein the cell array (120) is at least partially formed from at least one of a dielectric material and a polymer.

A47. The system (100) of any of paragraphs A1-A46 wherein the system (100) further includes a plurality of ion transport membranes (174), wherein each ion transport membrane (174) in the plurality ion transport membranes (174) encircles a corresponding energy-producing insert (150) in the plurality of energy-producing inserts (150) and electrically separates the corresponding energy-producing insert (150) from the cell array (120).

A48. The system (100) of any of paragraphs A1-A47, wherein:

(i) the cell array (120) includes a copper coating that at least partially defines each elongate cell volume (130) in the plurality of elongate cell volumes (130) and defines a corresponding cell electrode (128);

(ii) each energy-producing insert (150) includes an aluminum coating that coats an external surface thereof and defines a corresponding insert electrode (168); and (iii) each energy-producing insert (150) includes an ion-permeable coating (170) that coats the aluminum coating thereof and defines an ion host.

A49. The system (100) of any of paragraphs A1-A48, wherein:

the aircraft structural component (110) includes a wing (20) of the aircraft (10);

the cell array (120) is structurally integrated with the wing (20); and a longitudinal axis of the plurality of elongate cell volumes (130) extends at least substantially parallel to a spanwise direction of the wing (20).

A50. The system (100) of paragraph A49, wherein the cell array (120) extends within a threshold fraction of a transverse cross-section of the wing (20).

A51. The system (100) of paragraph A50, wherein the threshold fraction is at least one of:

(i) at least 20%, at least 30%, at least 40%, at least 50%, at least 60%, at least 70%, at least 80%, or at least 90%;

(ii) at most 90%, at most 80%, at most 70%, at most 60%, at most 50%, at most 40%, at most 30%, or at most 20%; and (iii) at least substantially 100%.

A52. The system (100) of any of paragraphs A1-A51, wherein:

the aircraft structural component (110) includes a spar (80) of the aircraft (10);

the cell array (120) is structurally integrated within the spar (80); and a longitudinal axis of the plurality of elongate cell volumes (130) extends at least substantially parallel to a longitudinal axis of the spar (80).

A53. The system (100) of any of paragraphs A1-A52, wherein:

the aircraft structural component (110) includes a skin (90) of the aircraft (10);

the cell array (120) is structurally integrated within the skin (90); and a longitudinal axis of the plurality of elongate cell volumes (130) extends at least substantially parallel to an exposed surface of the skin (90).

A54. An aircraft (10) including the structurally integrated energy supply system (100) of any of paragraphs A1-A53.

B1. A method (200) of forming a structurally integrated energy supply system (100) for an aircraft (10), the method (200) comprising:

providing (210) an aircraft structural component (110) that at least partially defines an interior region (112);

providing (220) a cell array (120) that includes a plurality of cell walls (122) that defines a plurality of elongate cell volumes (130), wherein the cell array (120) is positioned within the interior region (112), and further wherein the cell array (120) provides structural load distribution, via the plurality of cell walls (122), to the aircraft structural component (110) such that the cell array (120) contributes to a structural stiffness of the aircraft structural component (110);

providing (240) a plurality of energy-producing inserts (150), wherein each energy-producing insert (150) in the plurality of energy-producing inserts (150) is configured to produce a corresponding insert electric current; and positioning (250) each energy-producing insert (150) in the plurality of energy-producing inserts (150) within a corresponding elongate cell volume (130) in the plurality of elongate cell volumes (130).

B2. The method (200) of paragraph B1, wherein the cell array (120) forms a portion of the aircraft structural component (110), and further wherein the providing (210) the aircraft structural component (110) and the providing (220) the cell array (120) are performed simultaneously.

B3. The method (200) of any of paragraphs B1-B2, wherein the cell array (120) is distinct from the aircraft structural component (110), and further wherein the method (200) includes positioning (230) the cell array (120) within the interior region (112).

B4. The method (200) of paragraph B3, wherein the positioning (230) the cell array (120) is at least one of:

(i) prior to the positioning (250) each energy-producing insert (150);

(ii) subsequent to the positioning (250) each energy-producing insert (150); and (iii) at least partially concurrent with the positioning (250) each energy-producing insert (150).

B5. The method (200) of any of paragraphs B1-B4, wherein the aircraft structural component (110) includes any suitable structure of any of the aircraft structural components (110) of any of paragraphs A1-A52.

B6. The method (200) of any of paragraphs B1-B5, wherein the cell array (120) includes any suitable structure of any of the cell arrays (120) of any of paragraphs A1-A52.

B7. The method (200) of any of paragraphs B1-B6, wherein the plurality of energy-producing inserts (150) includes any suitable structure of any of the plurality of energy-producing inserts (150) of any of paragraphs A1-A53.

U1. The use, in an aircraft structural component (110), of an array of elongate cells for both energy storage and structural integrity.

U2. The use, in an aircraft structural component (110), of a combination of an array of elongate cells and a plurality of energy storage inserts, positioned within the array of elongate cells, for both energy storage and structural integrity.

U3. The use of any of the systems (100) of any of paragraphs A1-A53 with any of the methods (200) of any of paragraphs B1-B7.

U4. The use of any of the methods (200) of any of paragraphs B1-B7 with any of the systems (100) of any of paragraphs A1-A53.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A structurally integrated energy supply system for an aircraft, the system comprising:
   an aircraft structural component that at least partially defines an interior region;
   a cell array that includes a plurality of cell walls that defines a plurality of elongate cell volumes, wherein the cell array is positioned within the interior region;
   a plurality of energy-producing inserts, wherein:
   (i) each energy-producing insert in the plurality of energy-producing inserts is positioned within a corresponding elongate cell volume in the plurality of elongate cell volumes and is configured to produce a corresponding insert electric current;
   (ii) wherein the plurality of energy-producing inserts at least partially defines a plurality of electrolytic energy-producing inserts;
   (iii) wherein each electrolytic energy-producing insert in the plurality of electrolytic energy-producing inserts is configured to electrochemically produce the corresponding insert electric current from a reactant stream;
   (iv) wherein each energy-producing insert is tapered and shaped to define an interference fit with the corresponding elongate cell volume; and
   a reactant supply system configured to provide the reactant stream to the plurality of electrolytic energy-producing inserts;
   wherein:
   (i) the cell array provides structural load distribution, via the plurality of cell walls, to the aircraft structural component such that the cell array contributes to a structural stiffness of the aircraft structural component;
   (ii) the cell array includes an electrically conductive cell coating that is defined by a cell coating material that coats an interior of the plurality of cell walls and is supported by the plurality of cell walls, wherein the electrically conductive cell coating defines a plurality of cell electrodes, and further wherein each cell electrode in the plurality of cell electrodes at least partially defines a corresponding elongate cell volume in the plurality of elongate cell volumes;
   (iii) each energy-producing insert includes an electrically conductive insert coating that coats an external surface thereof and is defined by an insert coating material, wherein the electrically conductive insert coating defines a corresponding insert electrode, and further wherein the insert coating material differs from the cell coating material; and
   (iv) each energy-producing insert includes an ion-permeable coating that is defined by an electrically insulating ion-permeable material, wherein the ion-permeable coating coats the electrically conductive cell coating.

2. The system of claim 1, wherein the ion-permeable coating electrically separates the corresponding insert electrode of each energy-producing insert from a corresponding cell electrode in the plurality of cell electrodes.

3. The system of claim 1, wherein the ion-permeable coating defines an ion host for the energy-producing insert.

4. The system of claim 1, wherein the system further includes an electrolyte material that includes ions dissolved in a solvent, wherein the electrolyte material electrically contacts the plurality of cell electrodes and the corresponding insert electrode and facilitates transport of the ions between the corresponding insert electrode of each energy-producing insert and a corresponding cell electrode in the plurality of cell electrodes.

5. The system of claim 4, wherein the corresponding insert electrode and the electrolyte material together define an insert half-cell potential, wherein the corresponding cell electrode and the electrolyte material together define a cell half-cell potential, and further wherein the insert half-cell potential differs from the cell half-cell potential.

6. The system of claim 4, wherein:
   the ions include lithium ions;
   the cell coating material includes copper and the corresponding cell electrode is a positive electrode of an electrochemical cell that includes the corresponding cell electrode, the electrolyte material, and the corresponding insert electrode; and
   the insert coating material includes aluminum and the corresponding insert electrode is a negative electrode of the electrochemical cell.

7. The system of claim 6, wherein the plurality of elongate cell volumes includes a plurality of elongate hexagonal cell volumes.

8. The system of claim 1, wherein the insert coating material includes at least one of:
   (i) an electrically conductive insert coating material;
   (ii) a metallic insert coating material; and
   (iii) an aluminum insert coating material.

9. The system of claim 1, wherein the cell coating material includes at least one of:
   (i) an electrically conductive cell coating material;
   (ii) a metallic cell coating material; and
   (iii) a copper cell coating material.

10. The system of claim 1, wherein the electrically insulating ion-permeable material includes at least one of:
    (i) a barrier material that spatially separates each energy-producing insert from the plurality of cell walls; and
    (ii) an ion-permeable ceramic.

11. The system of claim 1, wherein the plurality of energy-producing inserts at least partially defines at least one of:
    (i) a plurality of energy-storage devices;
    (ii) a plurality of batteries; and
    (iii) a plurality of capacitors.

12. The system of claim 1, wherein the plurality of elongate cell volumes defines at least one of:
(i) a plurality of elongate polygonal cell volumes;
(ii) a plurality of elongate triangular cell volumes;
(iii) a plurality of elongate rectangular cell volumes;
(iv) a plurality of elongate pentagonal cell volumes;
(v) a plurality of elongate hexagonal cell volumes;
(vi) a plurality of elongate heptagonal cell volumes;
(vii) a plurality of elongate octagonal cell volumes;
(viii) a plurality of elongate nonagonal cell volumes; and
(ix) a plurality of elongate decagonal cell volumes.

13. The system of claim 1, wherein the plurality of cell walls defines a plurality of polygonal shaped elongate cell volumes forming a lattice structure that provides load distribution, through the plurality of cell walls, to the aircraft structural component.

14. The system of claim 1, wherein the aircraft structural component defines a first external surface and a second external surface, wherein a region of the first external surface and a corresponding region of the second external surface face in opposite directions, and further wherein the cell array provides load distribution that increases a structural stiffness of the aircraft structural component when measured in a direction that extends between the region of the first external surface and the corresponding region of the second external surface.

15. The system of claim 1, wherein the cell array includes a plurality of electrical conductors configured to electrically interconnect at least a subset of the plurality of energy-producing inserts.

16. The system of claim 1, wherein the cell array includes a thermal mitigation structure configured to regulate a temperature of the plurality of energy-producing inserts.

17. The system of claim 1, wherein:
the aircraft structural component includes a spar of the aircraft;
the cell array is structurally integrated within the spar; and
a longitudinal axis of the plurality of elongate cell volumes extends parallel to a longitudinal axis of the spar.

18. The system of claim 1, wherein:
the aircraft structural component includes a skin of the aircraft;
the cell array is structurally integrated within the skin; and
a longitudinal axis of the plurality of elongate cell volumes extends at least substantially parallel to an exposed surface of the skin.

19. A method of forming a structurally integrated energy supply system for an aircraft, the method comprising:
providing an aircraft structural component that at least partially defines an interior region;
providing a cell array that includes a plurality of cell walls that defines a plurality of elongate cell volumes, and positioning the cell array within the interior region, wherein:
(i) the cell array provides structural load distribution, via the plurality of cell walls, to the aircraft structural component such that the cell array contributes to a structural stiffness of the aircraft structural component; and
(ii) the cell array includes an electrically conductive cell coating that is defined by a cell coating material that coats an interior of the plurality of cell walls and is supported by the plurality of cell walls, wherein the electrically conductive cell coating defines a plurality of cell electrodes, and further wherein each cell electrode in the plurality of cell electrodes at least partially defines a corresponding elongate cell volume in the plurality of elongate cell volumes;
providing a plurality of electrolytic energy-producing inserts, wherein each energy-producing insert in the plurality of electrolytic energy-producing inserts:
(i) is configured to electrochemically produce a corresponding insert electric current from a reactant stream;
(ii) includes an electrically conductive insert coating that coats an external surface thereof and is defined by an insert coating material, wherein the electrically conductive insert coating defines a corresponding insert electrode, and further wherein the insert coating material differs from the cell coating material;
(iii) includes an ion-permeable coating that is defined by an electrically insulating ion-permeable material, wherein the ion-permeable coating coats the electrically conductive cell coating; and
(iv) is tapered and shaped to define an interference fit with the corresponding elongate cell volume; and
positioning each energy-producing insert in the plurality of electrolytic energy-producing inserts within a corresponding elongate cell volume in the plurality of elongate cell volumes.

20. The method of claim 19, wherein the method further includes interconnecting the structurally integrated energy supply system with a reactant supply system configure to provide the reactant stream to the plurality of electrolytic energy-producing inserts.

21. A structurally integrated energy supply system for an aircraft, the system comprising:
an aircraft structural component that at least partially defines an interior region;
a cell array that includes a plurality of cell walls that defines a plurality of elongate cell volumes, wherein the cell array is positioned within the interior region;
a plurality of energy-producing inserts, wherein:
(i) each energy-producing insert in the plurality of energy-producing inserts is positioned within a corresponding elongate cell volume in the plurality of elongate cell volumes and is configured to produce a corresponding insert electric current;
(ii) wherein the plurality of energy-producing inserts at least partially defines a plurality of electrolytic energy-producing inserts; and
(iii) wherein each electrolytic energy-producing insert in the plurality of electrolytic energy-producing inserts is configured to electrochemically produce the corresponding insert electric current from a reactant stream; and
a reactant supply system configured to provide the reactant stream to the plurality of electrolytic energy-producing inserts;
wherein:
(i) the cell array provides structural load distribution, via the plurality of cell walls, to the aircraft structural component such that the cell array contributes to a structural stiffness of the aircraft structural component;
(ii) the cell array includes an electrically conductive cell coating that is defined by a cell coating material that coats an interior of the plurality of cell walls and is supported by the plurality of cell walls, wherein the electrically conductive cell coating defines a plurality of cell electrodes, and further wherein each cell electrode in the plurality of cell electrodes at least partially defines a corresponding elongate cell volume in the plurality of elongate cell volumes;

(iii) each energy-producing insert includes an electrically conductive insert coating that coats an external surface thereof and is defined by an insert coating material, wherein the electrically conductive insert coating defines a corresponding insert electrode, and further wherein the insert coating material differs from the cell coating material; and (iv) each energy-producing insert includes an ion-permeable coating that is defined by an electrically insulating ion-permeable material, wherein the ion-permeable coating coats the electrically conductive cell coating; and wherein:
(i) the aircraft structural component includes a spar of the aircraft;
(ii) the cell array is structurally integrated within the spar; and
(iii) a longitudinal axis of the plurality of elongate cell volumes extends parallel to a longitudinal axis of the spar.

22. A structurally integrated energy supply system for an aircraft, the system comprising:
an aircraft structural component that at least partially defines an interior region;
a cell array that includes a plurality of cell walls that defines a plurality of elongate cell volumes, wherein the cell array is positioned within the interior region;
a plurality of energy-producing inserts, wherein:
(i) each energy-producing insert in the plurality of energy-producing inserts is positioned within a corresponding elongate cell volume in the plurality of elongate cell volumes and is configured to produce a corresponding insert electric current;
(ii) wherein the plurality of energy-producing inserts at least partially defines a plurality of electrolytic energy-producing inserts; and
(iii) wherein each electrolytic energy-producing insert in the plurality of electrolytic energy- producing inserts is configured to electrochemically produce the corresponding insert electric current from a reactant stream; and
a reactant supply system configured to provide the reactant stream to the plurality of electrolytic energy-producing inserts;

wherein:
(i) the cell array provides structural load distribution, via the plurality of cell walls, to the aircraft structural component such that the cell array contributes to a structural stiffness of the aircraft structural component;
(ii) the cell array includes an electrically conductive cell coating that is defined by a cell coating material that coats an interior of the plurality of cell walls and is supported by the plurality of cell walls, wherein the electrically conductive cell coating defines a plurality of cell electrodes, and further wherein each cell electrode in the plurality of cell electrodes at least partially defines a corresponding elongate cell volume in the plurality of elongate cell volumes;
(iii) each energy-producing insert includes an electrically conductive insert coating that coats an external surface thereof and is defined by an insert coating material, wherein the electrically conductive insert coating defines a corresponding insert electrode, and further wherein the insert coating material differs from the cell coating material; and
(iv) each energy-producing insert includes an ion-permeable coating that is defined by an electrically insulating ion-permeable material, wherein the ion-permeable coating coats the electrically conductive cell coating; and wherein:
the aircraft structural component includes a skin of the aircraft;
the cell array is structurally integrated within the skin; and
a longitudinal axis of the plurality of elongate cell volumes extends parallel to an exposed surface of the skin.

* * * * *

UNITED STATES PATENT AND TRADEMARK OFFICE
CERTIFICATE OF CORRECTION

| | |
|---|---|
| PATENT NO. | : 12,043,126 B2 |
| APPLICATION NO. | : 16/282096 |
| DATED | : July 23, 2024 |
| INVENTOR(S) | : Roger D. Bernhardt and Donald V. Drouin |

It is certified that error appears in the above-identified patent and that said Letters Patent is hereby corrected as shown below:

In the Claims

In Claim 1, Column 17, Lines 46-49, the portion of the claim reading, "(iii) wherein each electrolytic energy-producing insert in the plurality of electrolytic energy-producing inserts is configured to electrochemically produce the corresponding insert electric current from a reactant stream;" should read --(iii) wherein each electrolytic energy-producing insert in the plurality of electrolytic energy-producing inserts is configured to electrochemically produce the corresponding insert electric current from a reactant stream; and--

In Claim 18, Column 19, Lines 45-47, the portion of the claim reading, "elongate cell volumes extends at least substantially parallel to an exposed surface of the skin." should read --elongate cell volumes extends parallel to an exposed surface of the skin.--

Signed and Sealed this
Nineteenth Day of November, 2024

*Katherine Kelly Vidal*
Katherine Kelly Vidal
*Director of the United States Patent and Trademark Office*